No. 854,380. PATENTED MAY 21, 1907.
F. C. OTT & W. A. KOST.
NUT LOCK.
APPLICATION FILED FEB. 26, 1907.

Witnesses
Arthur Wesley
M. A. Schmidt

Inventors
Frank C. Ott
William A. Kost
By
Attorneys

UNITED STATES PATENT OFFICE.

FRANK C. OTT AND WILLIAM A. KOST, OF SWISSVALE, PENNSYLVANIA.

NUT-LOCK.

No. 854,380.

Specification of Letters Patent.

Patented May 21, 1907.

Application filed February 26, 1907. Serial No. 359,535.

*To all whom it may concern:*

Be it known that we, FRANK C. OTT and WILLIAM A. KOST, citizens of the United States, residing at Swissvale, in the county of Allegheny and State of Pennsylvania, have invented certain new and useful Improvements in Nut-Locks, of which the following is a specification.

This invention is a nut-lock and has for its object to provide a simple and effective locking device of this kind, and also one embodying certain novel features of construction to be hereinafter described whereby the unlocking of the nut for its removal from the bolt is readily effected without injuring or impairing the efficiency of the locking device for further use.

Figure 1:
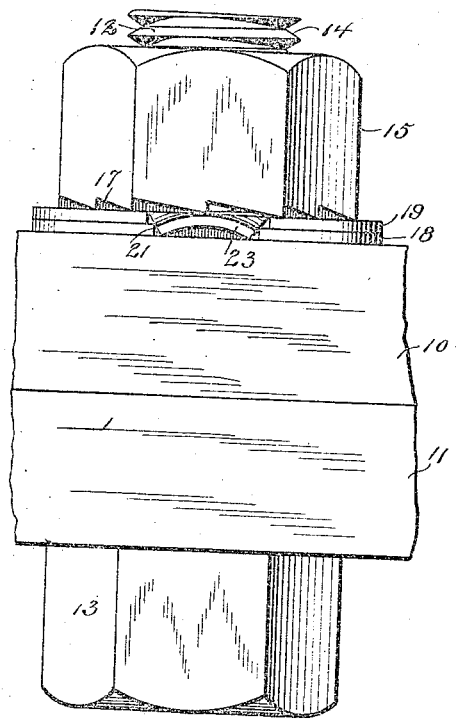
Figure 3:
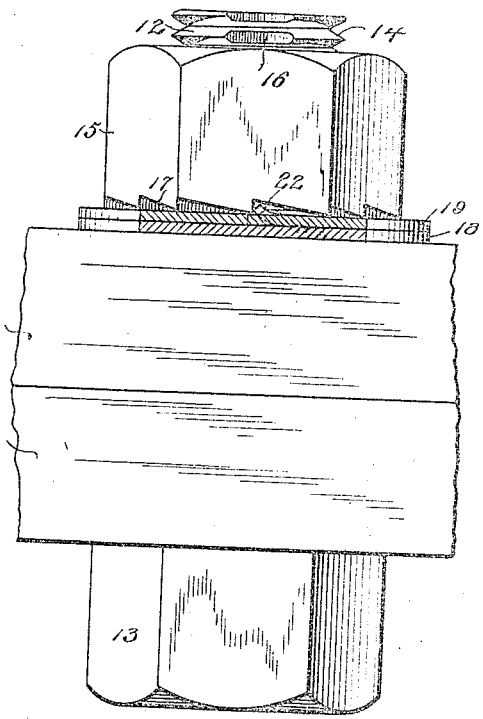
Figure 2:
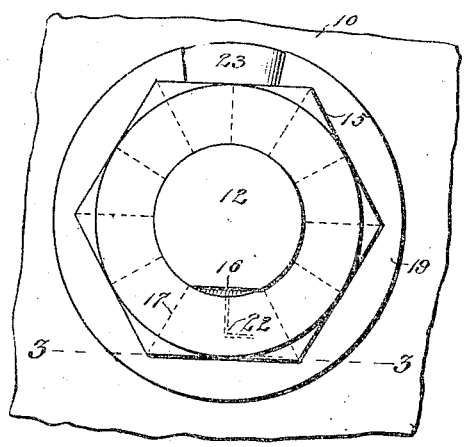
Figures 4, 5:
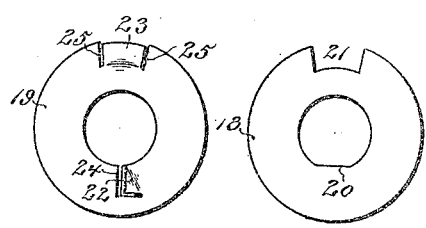
Figure 6:
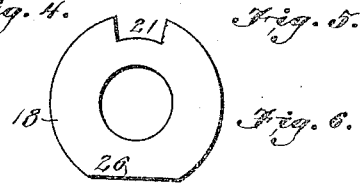

In the accompanying drawings, Figure 1 is a side elevation of the invention. Fig. 2 is a plan view. Fig. 3 is an elevation partly in section on the line 3—3 of Fig. 2. Figs. 4, 5 and 6 are plan views of the washers hereinafter referred to.

Referring specifically to the drawing, 10 and 11 denote two pieces of material which are fastened together by a bolt 12 having a head 13 and a threaded portion 14 on which the nut 15 is screwed. The threaded portion of the bolt is flattened as indicated at 16 for a purpose to be hereinafter described. Only a small portion of the bolt need be cut away to form the flat portion so that the bolt will not be weakened. The base of the nut is formed with ratchet teeth 17.

On the bolt, between the base of the nut and the substructure, are mounted washers 18 and 19. The washer 18 is next to the substructure and is made non-rotatable by forming its bolt-hole with a flattened portion 20 corresponding with the flattened portion 16 of the bolt. The edge of this washer is also recessed as at 21. The washer 19 has a spring tongue 22 engageable with the ratchet teeth 17; and at a point substantially diametrically opposite this spring tongue is another spring tongue 23 which is engageable with the recess 21. The tongue 22 prevents rotation of the nut in the direction to unscrew, and the tongue 23 prevents rotation of the washer 19 in either direction, whereby the nut is securely locked to the bolt.

The parts herein described are readily applied, it being necessary only to place the two washers in position on the bolt with the tongue 23 entering the recess 21. The nut is then screwed up tightly against the washer 19. The tongue 22 automatically locks the nut against any movement in the direction to unscrew but permits its free movement in the opposite direction. To unlock the nut, the tongue 23 is pried up out of the recess 21 which releases the washer 19 leaving it free to turn with the nut when the latter is unscrewed. The thickness of the tongue 23 is not greater than that of the washer 19, so that after it is pried up as stated and the washer is rotated a short distance, it can enter the space between the base of the nut and the face of the washer 18. When the tongue again reaches the recess it will enter the same again, but ordinarily the washer 19 will by this time be sufficiently loose so that there will be no further locking action between the tongue 22 and the ratchet teeth 17, and the nut is then entirely free to be turned off the bolt. If the tool for prying up the tongue is of the same thickness as the washer 18, it can be left in the recess, which will prevent the tongue from springing back thereinto.

The spring tongue 22 is formed by a short angular cut 24 in the washer 19 adjacent its bolt-hole. The tongue 23 is formed by two cuts 25 which extend inwardly from the edge of the washer for a short distance. The distance between the cuts 25 is such that the tongue 23 will be of a width to fit snugly in the recess 21.

In Fig. 6 is shown a form of washer to take the place of the washer 18 when the nut-lock is applied to a rail-joint. When used in this connection the bolt and the bolt-hole of the washer are not flattened, the washer being made non-rotatable by flattening its edge as at 26. In use, this part engages the foot of the fish-plate and thus prevents rotation of the washer.

We claim:—

A nut-lock comprising a bolt, a non-rotatable washer thereon having a recess, a nut having a ratchet base, and a rotatable washer between the nut and the recessed washer having oppositely presented spring tongues engageable respectively with the ratchet base and with the recess of the first mentioned washer, the spring tongue which engages said recess having a thickness not greater than that of its washer to permit it to enter the space between the base of the nut and the top of the recessed washer.

In testimony whereof we affix our signatures, in presence of two witnesses.

FRANK C. OTT.
WILLIAM A. KOST.

Witnesses:
GIDEON H. JAQUAY,
ALBERT P. RODEMS.